(12) United States Patent
McKay (10) Patent No.: US 7,575,257 B2
(45) Date of Patent: Aug. 18, 2009

(54) FITTING WITH SEQUENTIAL SEALING ACTION

(75) Inventor: Albert A. McKay, Stoney Creek (CA)

(73) Assignee: Lokring Technology Corporation, Ontario (CA)

( * ) Notice: Subject to any disclaimer, the term of this patent is extended or adjusted under 35 U.S.C. 154(b) by 417 days.

(21) Appl. No.: 11/065,656

(22) Filed: Feb. 24, 2005

(65) Prior Publication Data
US 2006/0186666 A1 Aug. 24, 2006

(51) Int. Cl.
*F16L 13/14* (2006.01)
(52) U.S. Cl. .................. 285/382; 285/382.1; 29/520
(58) Field of Classification Search ........... 285/382.1, 285/382.2, 382.7, 382; 29/520
See application file for complete search history.

(56) References Cited

U.S. PATENT DOCUMENTS

| | | | |
|---|---|---|---|
| 4,482,174 A | 11/1984 | Puri | |
| 5,110,163 A | 5/1992 | Benson et al. | |
| 5,114,191 A | 5/1992 | Sareshwala | |
| 5,181,752 A * | 1/1993 | Benson et al. | 285/382.2 |
| 5,305,510 A | 4/1994 | Croft et al. | |
| 5,709,418 A | 1/1998 | Benson et al. | |
| 6,131,964 A | 10/2000 | Sareshwata | |
| 6,467,752 B2 | 10/2002 | Woods | |
| 6,692,040 B1 | 2/2004 | McKay et al. | |
| 2005/0264006 A1* | 12/2005 | McKay | 285/256 |

FOREIGN PATENT DOCUMENTS

| | | |
|---|---|---|
| CA | 2078553 | 9/1991 |
| CA | 2289356 | 6/2000 |
| CA | 2421526 | 3/2002 |
| CA | 2346548 | 4/2002 |

* cited by examiner

*Primary Examiner*—Aaron M Dunwoody
(74) *Attorney, Agent, or Firm*—Fay Sharpe LLP (57) ABSTRACT

A fitting for making connections with a pipe includes a coupling body having an inside surface defining a bore for receiving a pipe. A ring is fitted over the coupling body for sealing and mechanically connecting the coupling body to the pipe. An axisymmetrical main seal is formed on the inside surface of the coupling body that seals and connects to the pipe when the ring is installed on the coupling body. An axisymmetrical inboard seal is formed on the inside surface of the coupling body axially spaced from the main seal that seals and connects to the pipe when the ring is installed on the coupling body. At least one of the coupling body and the ring is configured so that the inboard seal seals and connects after the main seal seals and connects to the pipe. An axisymmetrical outboard seal is formed on the inside surface of the coupling body axially spaced from the main seal that connects to the pipe when the ring is installed on the coupling body. At least one of the coupling body and the ring is further configured so that the outboard seal seals and mechanically connects after the inboard seal seals and connects to the pipe. At least one of the coupling body and the ring is still further configured to apply a restoring load to the main seal to further seal and mechanically connect the main seal to the pipe after the outboard seal seals and connects to the pipe.

23 Claims, 9 Drawing Sheets

FITTING WITH SEQUENTIAL SEALING ACTION

BACKGROUND

The present disclosure generally relates to fluid fittings and, more particularly, to an improved fitting with sequential sealing action. In one embodiment, a fitting includes a connector body having a sleeve that receives a tube or pipe therein and includes a plurality of radially extending seals for sealing and mechanically connecting to the tube or pipe when a swage ring is axially installed on the sleeve. In particular, the seals include a main seal which is set first, an inboard seal which is set second, and an outboard seal which is set third. After the outboard seal is set, a kickdown of the main seal also occurs. The improved fitting will be described with particular reference to this embodiment, but it is to be appreciated that the improved fitting may relate to other similar environments and applications.

Various types of fittings have been developed for joining tubes and pipes to other tubes and pipes, or to other fluid apparatus such as pumps, fluid motors, actuation cylinders, etc. For thin walled tubing or pipe, various types of fittings are used which compress against the outside diameter of the tube or pipe to create a seal. One particular type of such a fitting includes a swage ring which is forced over the fitting to compress it radially inwardly against the tube or pipe to create a seal. Generally, this type of fitting has one or more circumferential teeth or ridges on its inside diameter which, when compressed inwardly by a swage ring, engage the outside diameter of the tube or pipe to create one or more leak-tight mechanical connections or joints between the tube or pipe and the fitting. This engagement of the sealing teeth of the fitting with the tube or pipe causes the pipe to be deformed radially inwardly, with the coupling body of the fitting located externally about the tube or pipe.

Examples of such mechanically attached fittings are provided in U.S. Pat. Nos. 4,482,174; 5,110,163; 5,114,191; and 6,692,040. One example installation tool employable for attaching these types of fittings to a tube or pipe is described in U.S. Pat. No. 5,305,510. All the teachings and substance of these patents are hereby expressly incorporated by reference into the present application.

The types of fittings described in the preceding paragraphs are often designed so that the sealing ridges sequentially engage the tube or pipe upon which the fitting is being installed. Such sequential engagement reduces the installation force required to move the swage ring from an outboard position to a fully installed inboard position. This is due to the installation tool only being required to provide enough force to do the work necessary to cause deformation, and thus sealing engagement with the tube or pipe, at one sealing ridge location at a time. Performing the fitting installation at two or more sealing teeth locations simultaneously would require more force as more work would have to be done per increment of travel of the swage ring.

Sometimes the sealing ability of a fitting can be diminished, particularly as a consequence of two factors: (1) sequential tooth or seal engagement and (2) pipe radial deformation. For example, engagement of a second sealing tooth subsequent to engagement of a first sealing tooth, arid the attendant pipe deformation caused by the subsequent engagement, may reduce the loading force between the first sealing tooth and the tube or pipe. In this example, the loading force reduction due to the subsequent engagement of the second tooth results from the pipe being pushed away from the first tooth. In an extreme case, this may result in a gap being formed between the first sealing tooth and the tube or pipe and/or may result in diminished effectiveness of the seal between the first sealing tooth and the tube or pipe, particularly under the influence of an applied mechanical load such as bending and torsion.

The assignee of this application, Lokring Technology Corporation, manufactures, sells and/or distributes a variety of such sequential fittings. These fittings often include three (3) circumferential teeth or ridges, typically referred to as seals, including a main seal, an inboard seal and an outboard seal. As already discussed, the seals extend radially inward from an inside diameter of the fitting's body and are compressed inwardly by a swage ring axially installed on an outside diameter of the fitting body to create a leak-tight mechanical connections or joints between each seal and a tube or pipe received inside the fitting body to which the fitting is being connected. The engagement of the seals with the tube or pipe causes the same to be plastically deformed radially inward at the location of engagement with the seals.

The particular configuration of the fitting body and/or the swage ring often determines the order in which the seals (including the main, inboard and outboard seals) are forced into deforming contact with the tube or pipe. Applicant's three-seal fittings can employ different order sequences (i.e., the order in which the seals make deforming contact with the tube or pipe) for different fittings and particularly different sized fittings. In most cases, the main seal is the first of the seals forced into deforming contact with the tube or pipe, irrespective of the size of the fitting. However, the next seal to make deforming contact varies among various fittings of Lokring. Thus, in some fittings the outboard seal makes deforming contact immediately after the main seal and in other fittings the inboard seal makes deforming contact immediately after the main seal and before the outboard seal.

Some three-seal fittings of Lokring are configured for applying a kick down force to the main seal. Thus, after a particular surface of the swage ring forces the main seal into deforming contact with the tube or pipe, a second, diametrically smaller surface of the swage ring further forces the main seal into the tube or pipe. Like the order in which the inboard and outboard seals deforming contact the tube or pipe, the sequential order in which the kick down force is applied to the main seal varies from fitting to fitting. In some fittings, the main seal deformingly contacts the tube or pipe first, the outboard seal deformingly contacts the tube or pipe second, the inboard seal deformingly contacts the tube or pipe third and the kick down occurs last. In other fittings, the main seal deformingly contacts the tube or pipe first, the kick down effect-occurs second, the inboard seal deformingly contacts the tube or pipe third and the outboard seal deformingly contacts the tube or pipe last.

Accordingly an issue to be addressed is that of obtaining the optimal benefit of sequential engagement of the sealing teeth, particularly in a fitting wherein a main seal, an inboard seal and an outboard seal are provided with a kickdown of the main seal, while reducing or eliminating any associated reduction of load force between the tube or pipe and sealing teeth on the sealing teeth that were engaged early in the engagement sequence.

SUMMARY

In accordance with one aspect, a fitting is provided for making connections with a pipe. More particularly, in accordance with this aspect, the fitting includes a coupling body having an inside surface defining a bore for receiving a pipe. A ring is fitted over the coupling body for sealing and mechanically connecting the coupling body to the pipe. An axisymmetrical main seal is formed on the inside surface of the coupling body that seals and connects to the pipe when the ring is installed on the coupling body. An axisymmetrical inboard seal is formed on the inside surface of the coupling body axially spaced from the main seal that seals and connects to the pipe when the ring is installed on the coupling body. At least one of the coupling body and the ring is configured so that the inboard seal seals and connects after the main seal seals and connects to the pipe. An axisymmetrical outboard seal is formed on the inside surface of the coupling body axially spaced from the main seal that connects to the pipe when the ring is installed on the coupling body. At least one of the coupling body and the ring is further configured so that the outboard seal seals and mechanically connects after the inboard seal seals and connects to the pipe. At least one of the coupling body and the ring is still further configured to apply a restoring load to the main seal to further seal and mechanically connect the main seal to the pipe after the outboard seal seals and connects to the pipe.

In accordance with another aspect, a fitting is provided for making connections with a pipe. More particularly, in accordance with this aspect, the fitting includes a coupling body having an inside surface defining a bore for receiving a pipe and a plurality of seals extending into the bore from the inside surface. A swage ring is fitted over the coupling body for sequentially sealing and mechanically connecting the plurality of seals with the pipe. The plurality of seals include a circumferentially continuous main seal spaced axially inward relative to a distal end of the coupling body, a circumferentially continuous inboard seal spaced axially inward relative to the main seal, and a circumferentially continuous outboard seal spaced axially outward relative to the main seal and axially inward relative to the distal end. At least one of the coupling body and the ring is configured so that installation of the swage ring onto the coupling body sequentially causes the main seal, then the inboard seal and then the outboard seal to seal and mechanically connect with the pipe. At least one of the coupling body and the ring is also configured so that installation of the swage ring onto the coupling body applies a kickdown force on the main seal after the outboard seal is sealed and mechanically connected to the pipe.

In accordance with yet another aspect, a swage ring and coupling body arrangement is provided. More particularly, in accordance with this aspect, the swage ring and coupling body arrangement includes a swage ring and a coupling body. The swage ring has a proximal compression surface and a distal compression surface having a diameter smaller than the proximal compression surface. The proximal compression surface includes a first proximal section and a second kickdown section of reduced diameter. The coupling body has an inner surface defining a bore for receiving a tube and an outer surface over which the swage ring is received for mechanically and sealingly connecting the coupling body to the tube. The inner surface includes a plurality of radially extending seal structures including a main seal structure, an inboard seal structure and an outboard seal structure. The outer surface includes a plurality of radially extending lands including a main seal land opposite the main seal and an inboard seal land opposite the inboard seal.

The swage ring surfaces and the coupling body lands and seal structures are such that axial installation of the swage ring onto the coupling body first causes the proximal compression surface to engage the main seal land and thereby force the main seal structure to bite into the tube, next causes the proximal compression surface to engage the inboard seal land after the main seal structure bites into the tube and thereby force the inboard seal structure to bite into the tube, still next causes the distal compression surface to engage the coupling body opposite the outboard seal structure after the inboard seal structure bites into the tube and thereby force the outboard seal structure into the tube and finally causes the second kickdown section to apply a kickdown force to the main seal structure for restoring any lost load forces resulting from subsequent loading of the inboard and outboard seals.

In accordance with still another aspect, a method of connecting a fitting to a pipe is provided. The fitting includes a coupling body in a swage ring for axial installation over the coupling body. The pipe is inserted through a throughhole of the swage ring and into a bore of the coupling body. The swage ring is axially moved onto the coupling body to sequentially seal and mechanically connect a plurality of seals extending radially from the coupling body into the bore with the pipe. More specifically, a circumferentially continuous main seal of the plurality of seals is set into the pipe to mechanically connect and seal the coupling body to the pipe. After a main seal is set, a circumferentially continuous inboard seal of the plurality of seals is set into the pipe to further mechanically connect and seal the coupling body to the pipe. After the inboard seal is set, a circumferentially continuous outboard seal of the plurality of seals is set into the pipe to still further mechanically connect and seal the coupling body to the pipe. After the plurality of seals is set, a load force is applied onto the main seal for restoring any lost force to the main seal due to the subsequent setting of the inboard and outboard seals.

DETAILED DESCRIPTION

Referring now to the drawings wherein the showings are for purposes of illustrating one embodiment only and are not to be construed as limiting the invention, an improved fitting with sequential sealing action is shown for coupling two sections of tube or pipe together and generally designated by reference numeral 10. With specific reference to FIG. 1, the fitting 10 of the illustrated embodiment includes a coupling or coupling body 12 and at least one swage ring 14 (two in the illustrated embodiment which can be used to couple two sections of coaxial tubing or pipe together). As illustrated, the components 12,14 of the illustrated fitting 10 are generally axisymmetrical about axis 18.

Figure 1:
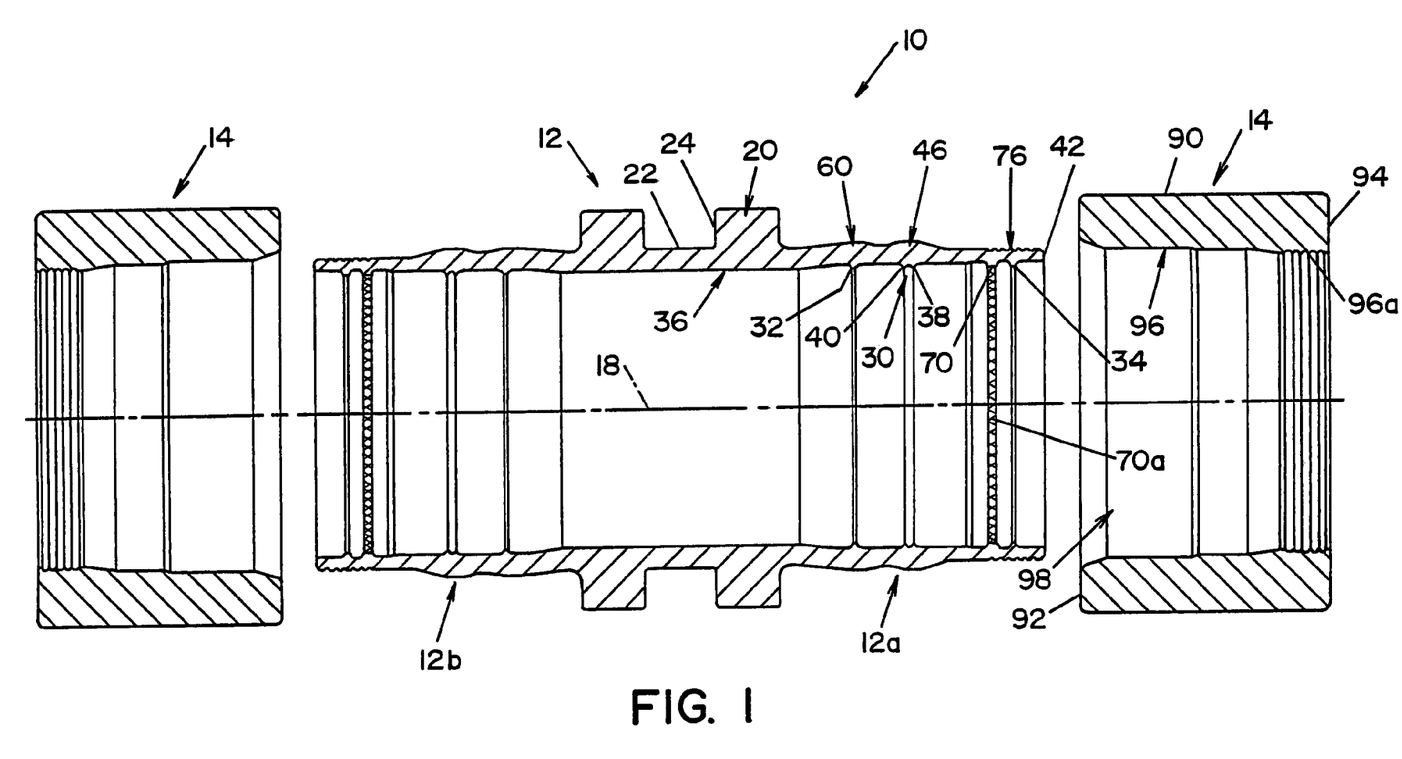
FIG. 1 is a cross-sectional view of a fitting having a coupling body and a pair of swage rings for connecting a first tube or pipe to a second tube or pipe.

The coupling body 12, also referred to herein as a connector body, of the illustrated fitting 10 includes first portion or sleeve 12a (which forms the right side of the coupling body in FIG. 1) and a second portion or sleeve 12b (which forms the left side of the coupling body in FIG. 1). The first sleeve 12a is adapted to receive a first section of tube or pipe (such as pipe 16 of FIG. 4) and the second sleeve 12b is adapted to receive a second section of tube or pipe. As will be described in more detail below, when the swage rings 14 are axially forced onto respective sleeves 12a, 12b with the tube or pipe sections received therein, the sleeves become mechanically connected to and sealed with the tube or pipe sections.

In one embodiment, the coupling body 12 and the swage ring 14 are formed of stainless steel and used in conjunction with a tube or pipe formed of 70/30 Copper Nickel. As will be appreciated and understood by those skilled in the art, the coupling body 12 and swage ring 14 could alternately be formed of any of a variety of other fitting materials, including for example carbon steel, 90/10 copper nickel, 70/30 copper nickel, etc. Likewise, the tube or pipe could be formed of a variety of other materials. The pipe 16 is, in one embodiment, one of a schedule 10 type pipe through a schedule 80 type pipe and has a wall thickness between about 0.057 inches to about 0.261 inches or is outside diameter-dimensioned tubing with wall thicknesses ranging from 0.035 inches through 0.109 inches.

Those skilled in the art will understand and appreciate that the exact configuration of the fitting 10 can vary and need not include exactly two sleeves in a coaxial configuration, as shown in the illustrated embodiment. For example, the fitting 10 could be integrally formed or adapted to connect with another component or type of fitting, and may have any number of sleeves extending at various locations therefrom for connecting to one or more corresponding tubes. A particular example could be a combination fitting and ball-valve wherein the fitting 10 is combinable with a ball-valve in a similar manner as described in commonly owned U.S. Pat. No. 6,467,752, expressly incorporated herein by reference.

As will also be understood and appreciated by those skilled in the art, the sleeves 12a, 12b are generally identical, except that they are axially mirrored relative to one another, and only first sleeve 12a will be described in further detail herein. In the illustrated embodiment, the sleeve 12a includes a circumferential flange or ridge 20 extending radially outwardly from exterior outside surface 22 of the body 10. As will be described in more detail below, the ridge 20 includes a tool engaging surface 24 which is used in joining the sleeve 12a to the adjacent swage ring 14 when connecting the fitting 10 to the tube 16 (FIG. 4) received therein. Tube 16 can alternately be referred to as a pipe, pipe section, tube section or the like. As used herein, the terms "pipe," "pipe section," "tube," and "tube section" are used interchangeably and all such components or elements and their equivalents are to be considered within the scope of the present invention.

Figure 2:
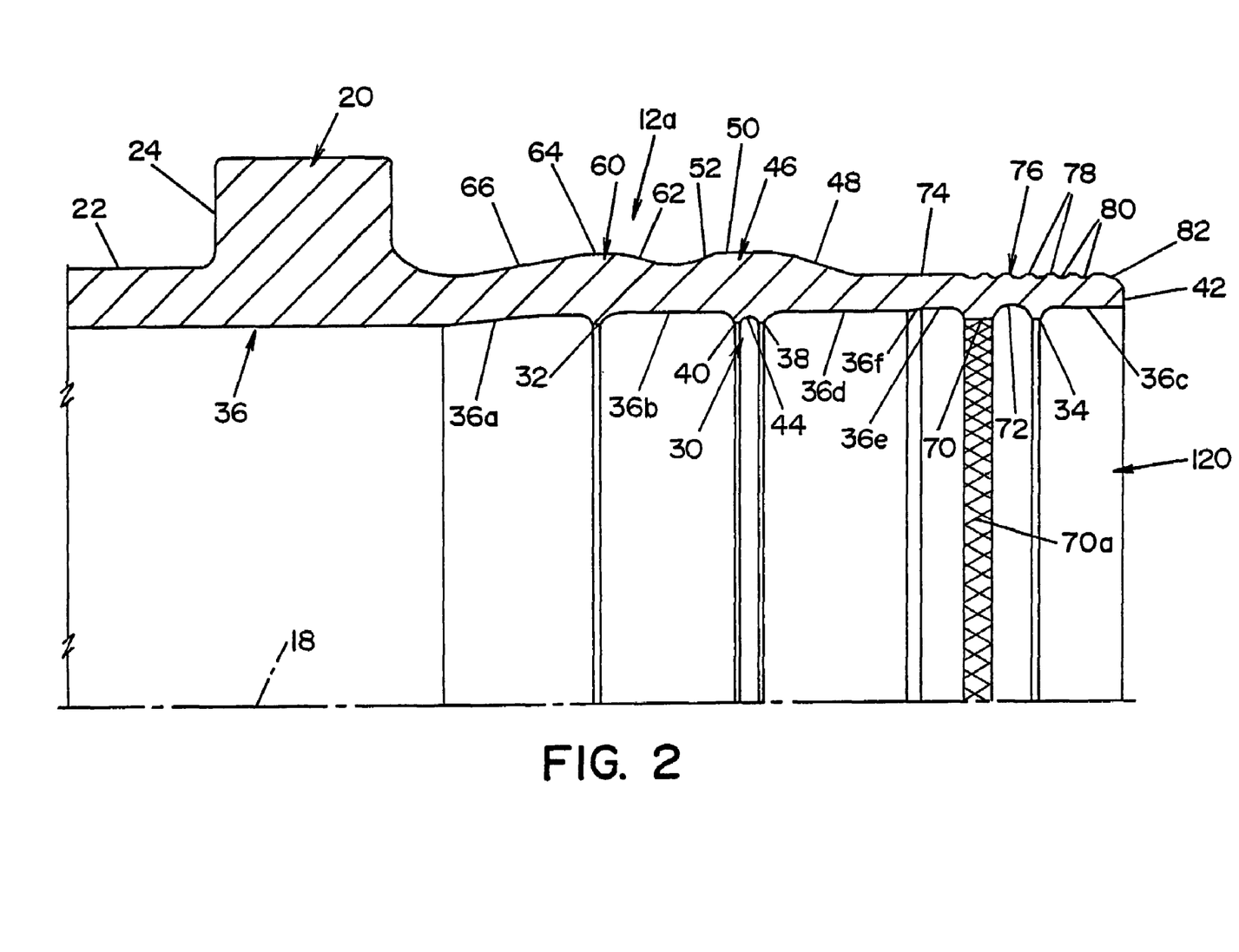
FIG. 2 is an enlarged partial cross-sectional view of the coupling body of FIG. 1.
Figure 4:
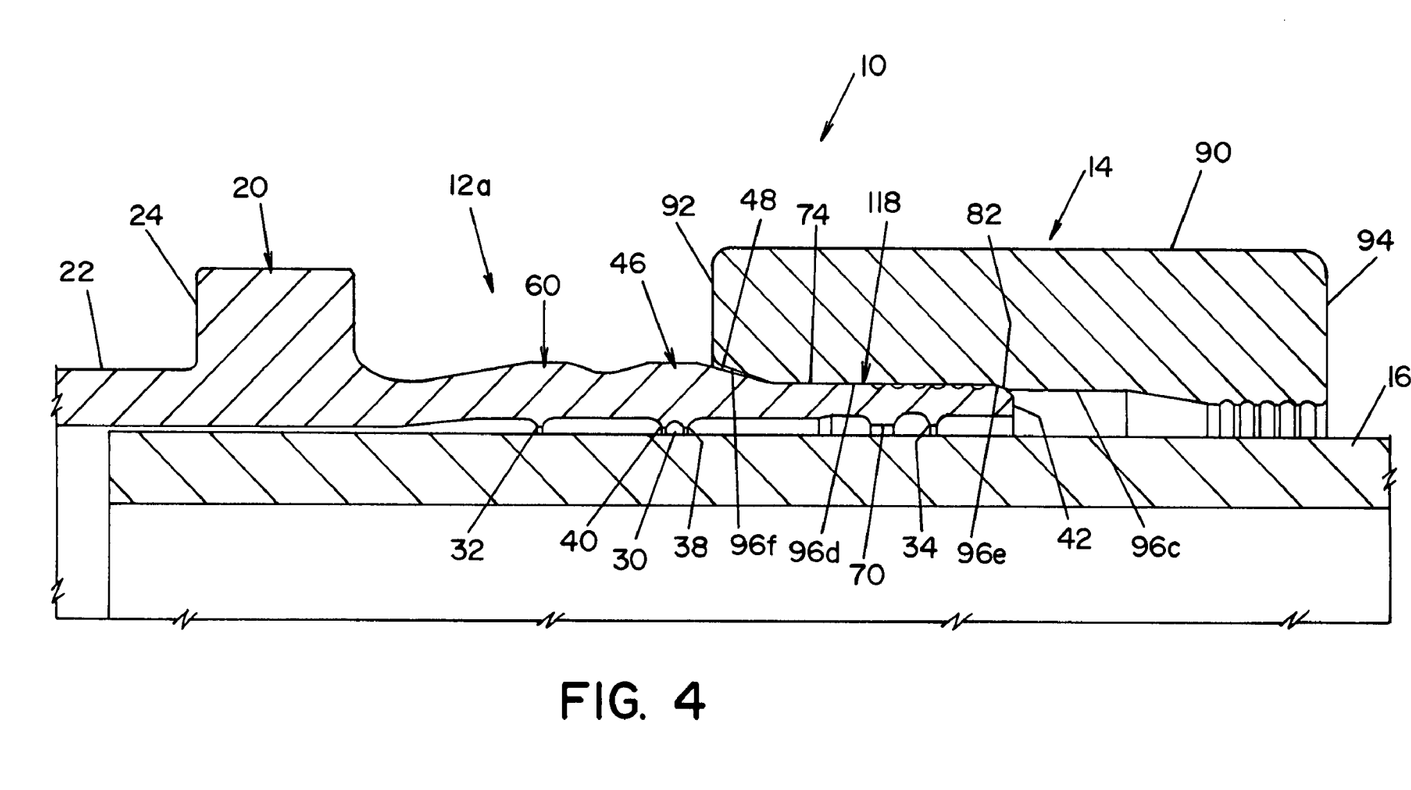
FIG. 4 is partial cross-sectional view of a fitting assembly including the fitting of FIG. 1, a tube or pipe received in the coupling body of the fitting, and one of the swage rings of the fitting shown in a preinstall position on the coupling body.

With additional reference to FIG. 2, the sleeve 12a includes a plurality of spaced apart seals, including main seal 30, inboard or proximal seal 32 and outboard or distal seal 34, for sealing between and mechanically connecting the coupling body 10 to pipe 16 (FIG. 4). The seals 30,32,34 are each positioned on or extend from interior surface 36 of the coupling body 10. As used herein, the terms "proximal" and "distal", as well as the terms "inboard" and "outboard", are used to generally indicate relative axial spacing, such as from the exterior flange 20 or the distal end 42. Thus, the distal or outboard seal 34 is axially spaced relative to the flange 20 a greater distance than is the proximal or inboard seal 32.

The main seal 30 serves to provide a main fluid seal and mechanical connection with the tube or pipe 16, as will be described in more detail below. In the illustrated embodiment, the main seal 30 includes first tooth 38 and second tooth 40 which are axially spaced from and between the circumferential ridge 20, also referred to herein as a swage ring stop, and a distal end 42 of the coupling body 10. The two-tooth main seal arrangement is more fully described in commonly-owned U.S. Pat. No. 5,110,163, expressly incorporated herein by reference. The teeth 38,40 are slightly separated from one another by groove 44. It is to be appreciated by those skilled in the art that the main seal 30 could alternatively be formed on only a single tooth or more than two teeth. A main seal compression land 46, also referred to herein as a seal urging feature or projection, is formed on and extends radially from outside surface 22 adjacent the main seal 30. In the illustrated embodiment, the land 46 is directly opposite the main seal 30 and includes an abrupt upslope ramp 48, a plateau 50 and a downslope ramp 52, which is shorter than the upslope ramp 48.

The inboard or proximal seal 32 is located between the main seal 30 and the ridge 20, axially spaced from each. Like the main seal 30, the inboard seal 32 is adapted to provide a fluid seal and a mechanical connection with the tube or pipe 16. In the illustrated embodiment, the inboard seal 32 is a single tooth, but it is to be appreciated by those skilled in the art that the inboard seal could be formed by a plurality of teeth, which can be separated from one another by one or more appropriate grooves. The interior surface 36 includes a gradual tapered section or taper 36a between the inboard seal 32 and the exterior flange 20 such that the seal 32 extends from a portion of the interior surface having a greater diameter than a portion immediately opposite the exterior flange 20. A diametrically constant section 36b of the interior surface 36, which substantially matches the greater diameter of the tapered section 36a, is provided between the inboard seal 32 and the main seal 30.

An inboard compression land 60, also referred to herein as an inboard or proximal seal urging feature or projection, is formed on and extends radially from outside surface 22 adjacent inboard seal 32. In the illustrated embodiment, the land 60 is positioned directly opposite the inboard seal 32 and includes an abrupt upslope ramp 62, a plateau 64 and a fairly gradually downslope ramp 66. The plateau 64 is generally radially aligned (i.e., has a substantially similar outer diameter) with the plateau 50 of the main seal land 46. The configuration of the inboard land 60, particularly the gradually downsloping ramp 66, can have the effect of assisting in or facilitating driving the seals 30,32 into the pipe 16. In the illustrated embodiment, the plateau 64 is immediately opposite the inboard seal 32, the ramp 62 extends from the plateau to the ramp 52 of the main seal land 46 at a location centrally positioned between the main seal 30 and the inboard seal 32, and the reverse taper ramp 66 extends from the plateau 64 to about the flange 20.

The outboard or distal seal 34 is located between the main seal 30 and the distal end 42, axially spaced from each. Like the seals 30,32, the outboard seal 34 is adapted to provide a fluid seal and a mechanical connection with the pipe 16. In the illustrated embodiment, the outboard seal 34 is a single tooth which can be referred to as the outboard isolation tooth. The outboard isolation tooth 34 is positioned adjacent the distal end 42 and axially spaced inwardly slightly therefrom. Section 36c of the interior surface 36 separates the distal end 42 from the outboard seal 34. It is to be appreciated by those skilled in the art that the outboard seal 34 can alternately be formed of a plurality of teeth, separated from one another by one or more appropriate grooves.

The connector body 10 of the illustrated embodiment further includes at least one anti-torsion ridge 70 located between the main seal 30 and the outboard seal 34. In the illustrated embodiment the at least one anti-torsion ridge 70 is a single ridge positioned adjacent the outboard isolation tooth 34, but axially spaced inwardly therefrom by a groove 72 defined in the interior surface 36. The torsion ridge 70 is primarily provided to carry torsion loads between the connector body 10 and the pipe 16. The anti-torsion ridge, also referred to herein as a torsion ridge, is spaced axially outwardly from the main seal 30 a sufficient distance so that a reduction of the diameter of pipe 16 by the main seal 30 does not interfere with engagement between the torsion ridge 70 and the pipe 16. The torsion ridge 70 preferably has friction surfaces 70a which can be formed by knurling, broaching or the like to better resist torsion loads. Further details concerning the anti-torsion ridge 70 and its function are provided in commonly owned U.S. Pat. Nos. 6,692,040 and 6,131,964, both expressly incorporated herein by reference.

The portion of the inner surface 36 between the torsion ridge 70 and the main seal 30 includes a first diametrically constant section 36d adjacent the main seal 30, a second diametrically constant section 36e adjacent the torsion ridge 70 that is relatively greater in diameter than the first section 36d, and a short tapered section 36f connecting the sections 36d,36e. The short tapered section 36f is positioned more closely adjacent the torsion land 70 than the main seal 30. In one embodiment, the second section 36e is larger in diameter than the first section 36d to accommodate a knurling tool for forming the friction surfaces of the torsion ridge 70.

As taught in the above-referenced '040 patent, in an alternate embodiment, the outboard isolation tooth 34 can be replaced and/or serve as a distal torsion ridge, in addition to or in replacement of the torsion ridge 70. Similar to and/or with the torsion ridge 70, the distal torsion ridge would primarily serve to carry torsion loads between the connector body 12 and the pipe 16. When both are employed, the spacing between the torsion ridge 70 and the alternate distal torsion ridge is sufficient to prevent pipe reductions caused by either one of the torsion ridges from affecting the other. Like the ridge 70, the alternate distal torsion ridge can include a frictional surface formed by knurling, broaching or the like to better resist torsion loads.

Returning to the illustrated embodiment, the outside surface 22 has a distal portion 74 between the land 46 and the distal end 42. The distal portion 74 has a relatively smaller diameter than the lands 46,60, the flange 20 and a portion of the exterior surface 22 adjacent the flange 20. The distal portion 74 of the connector body 10 has an increased friction section 76, also referred to as a locking mechanism, adjacent the distal end 42. In the illustrated embodiment, the friction section 76 includes a plurality of ridges 78 separated from one another by grooves 80 to better retain the swage ring 14 on the connector body 10 once the swage ring 14 is fully installed on the body 10. More particularly, the friction ridges 78 assist in preventing the swage ring 14 from slipping or working off the connector body 10. Another feature provided adjacent the distal end 42 is taper 82 which preferably has a taper angle of about twenty degrees (20°). The taper 82 assists in initially installing the swage ring 14 onto the connector body 10. Both features 76 and 82 are more fully described in the above-incorporated '040 and '964 patents.

The swage ring 14, also referred to herein as a drive ring, is sized to be annularly received over and axially forced along the sleeve 12a toward the flange 20 for urging the seals 30,32,34 into the pipe 16 to seal and mechanically connect the body 12 with the pipe. More specifically, with additional reference to FIG. 3, the swage ring 14 includes a proximal portion 14a and a distal portion 14b. In the illustrated embodiment, the swage ring 14 includes an exterior surface 90 having a relatively constant outside diameter. As illustrated, the distal portion 14b is generally thicker than the proximal portion 14a.

Figure 3:
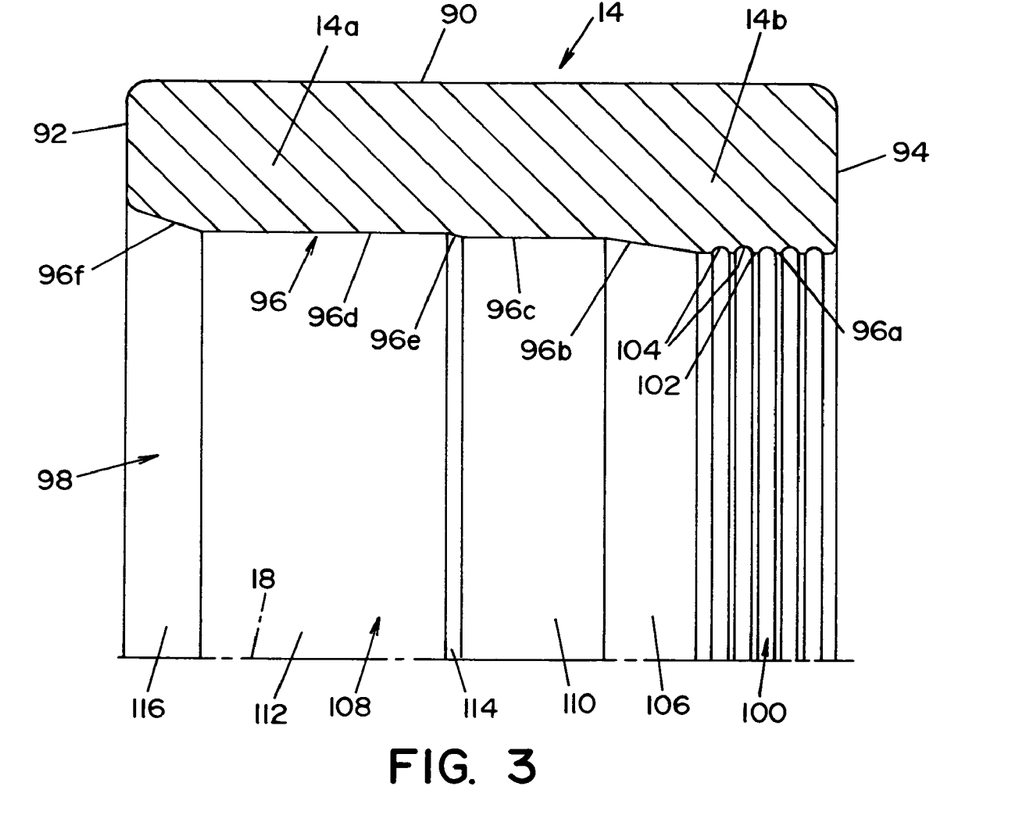
FIG. 3 is an enlarged partial cross-sectional view of one of the swage rings of FIG. 1.

The swage ring 14 further includes an interior surface 96 defining a throughhole 98 into which the coupling sleeve 12a is received when the ring 14 is installed onto the connector body 12. More particularly, the interior surface 96 includes distal compression surface or portion 96a defining a first or distal compression section 100 of the swage ring positioned adjacent the distal end 94. In the illustrated embodiment, the compression surface 96a includes a plurality of ridges 102 separated from one another by grooves 104 and can be referred to as a friction section or a locking mechanism. The ridges and grooves 102,104 assist in better retaining the swage ring 14 on the connector body 12 when the ring is fully installed on the body 12. More particularly, the friction ridges 102 assist in preventing the swage ring 14 from slipping or working off the distal end 42 of the connector body 12. Preferably, the locking mechanism 102,104 of the compression portion 96a cooperates and/or works in conjunction with the locking mechanism 78,80 of the connector body 12.

A tapered surface or portion 96b, defining a tapered section 106 of the ring 14, connects the distal compression surface 96a with a proximal compression surface or portion. As shown, the proximal compression surface has an increased diameter relative to the distal compression surface 96a. In the illustrated embodiment, the proximal compression surface is formed of a first segment 96c adjacent the tapered surface 96b, a second segment 96d spaced further inward relative to the distal end 94 than the first segment 96c, and a kick-down tapered segment 96e connecting the first segment 96c to the diametrically larger second segment 96d. The proximal compression surface (including segments 96c,96d,96e) forms a proximal compression section 108 of the swage ring 14, including segment sections 110,112,114 corresponding to the segments 96c,96d,96e.

A proximal taper 96f of the surface 96 flares open adjacent the proximal end 92 for facilitating easier insertion of the sleeve 12a, and particularly the lands 46,60 of the sleeve 12a, into the throughhole 98 when the ring 14 is installed onto the body 12. The proximal taper 96f defines a proximal tapered section 116 of the swage ring 14. In the illustrated embodiment, the angle of the proximal taper 96f substantially matches the angle of the upslope ramp 48 and facilitates axial movement of the swage ring 14 past the lands 46,60.

With additional reference to FIG. 4, the swage ring 14 is shown partially installed or preassembled on the connector body 12 in a pre-install or distal position. In this position, the swage ring taper 96f is adjacent, but slightly spaced relative to, the main seal land ramp 48 and optionally the kickdown taper 96e mates with distal taper 82. Through an interference fit 118, the swage ring 14 is maintained and can be shipped to customers in the pre-install position on the connector body 12, which facilitates ease of use and installation by the ultimate end-users. In particular, ease of use is facilitated by the fitting 10 being maintained as a partially assembled one-piece assembly, as opposed to the components of the assembly being multiple pieces separate from one another.

Specifically, the diameter of segment section 112 (the portion of the proximal compression surface on the proximal side of the kickdown taper 96e) is slightly smaller than the exterior diameter of the distal portion 74 so that the interference fit 118 is formed when the swage ring 14 is axially forced onto the connector body sleeve 12a to the pre-install position of FIG. 4. Though the interference fit 118 causes the sleeve 12a to partially contract radially, a sufficient inner diameter is maintained for all the seals 30,32,34 and the torsion ridge 70 so that pipe 16 can be inserted into bore 120 defined by the connector body inner surface 36. The sufficient inner diameter is large enough to accommodate a manufacturing tolerance of the fitting body 12, to accommodate a manufacturing tolerance of the pipe 16 and to maintain a clearance gap between the sleeve 12a and the pipe 16 that allows relatively easy insertion of the pipe 16 into the bore 120.

To fully install the swage ring 14 onto the sleeve 12a with the pipe 16 inserted therein for purposes of mechanically connecting and sealing the fitting 10 to the pipe, an installation tool (not shown) can be used to further force the swage ring 14 onto the sleeve 12a toward the tool engaging flange 20. One suitable installation tool is described in commonly-owned U.S. Pat. No. 5,305,510, expressly incorporated herein by reference. As will be known and appreciated by those skilled in the art, the installation tool has opposed jaws that engage the tool engaging surface 24 of the flange 20 and the swage ring distal end 94 and are actuated to force or press the swage ring 14 toward the flange 20 to a final installation position (shown in FIG. 9). Axial movement of the swage ring 14 onto the connector body 12 with the pipe 16 inserted therein causes radial movement of the fitting body 12, and particularly the seals 30,32,34 of the fitting body, toward or into the pipe 16 to create seals and mechanical connections therewith.

As will be described in more detail below, the connector body 12 (specifically, the connector body sleeve 12a) and the swage ring 14 are configured so that the seals 30,32,34 are sequentially set, one at a time, and a restoring load force is applied to the main seal 30, all in a preferred order as the swage ring is moved from the preinstalled position to the final installed position. That is, there is no deforming contact with the pipe 16 by an un-set seal until the prior seal (none in the case of the main seal) is fully set. Setting of a seal means the tooth or teeth of the seal are swaged or forced into deforming contact with the pipe. Setting of a seal is considered complete (i.e., fully set) when the seal's tooth or teeth are completely forced into the pipe (i.e., when the exterior surface 22 immediately opposite the seal 30 or 32 or 34 has no further radial movement as a result of being forced inward by a particular section of the swage ring 14). Alternatively, full setting of a seal can be defined as when the drive ring 14 has forced the tooth or teeth of the seal furthest into the pipe 16 or when an actuating taper of the drive ring 14 levels out to a diametrically constant cylindrical section as the drive ring moves past the seal.

Thus, initial setting occurs as the tooth or teeth of a seal close the gap (described above) between the connector body 12 and the pipe 16 and begin deforming the pipe. More particularly, once the gap is closed (i.e., the tooth or teeth of the seal contact or engage the pipe 16), the tooth or teeth radially move or bite into the pipe 16. The pipe 16 typically becomes stressed beyond its elastic limit as the seal tooth or teeth continue to move thereinto and begins to plastically deform or move radially inwardly resulting in permanent deformation. When deforming the pipe 16, the tooth or teeth are typically compressed or squished causing tooth deformation which has the advantage of filling any rough or irregular surface imperfections adjacent the teeth. Such rough or irregular surface imperfections are sometimes found on the outside of tubes or pipes, such as pipe 16, to which it is desirable to connect the fitting 10. Often, the biting of the seal tooth or teeth into the pipe 16 is accompanied by some growth, typically in elastic form, of the drive ring.

The sequential setting of the seals and applying of the restoring load-force on the main seal is determined or defined by the specific locations on the drive ring 14 of the various sections 96a,96c,96d (the diametrically constant sections) and the tapers 96b,96e,96f (the actuating tapers) leading to these sections and particularly the specific locations relative to one another. Thus, as will be described in further detail below, the illustrated embodiment employs a sequential setting of the seals and application of the restoring force on the main seal wherein the seals are set and kicked-down in the following order: (1) main seal 30; (2) inboard seal 32; (3) outboard seal 34; and (4) kickdown of main seal 30. In setting the main seal first, the taper 96f initially begins to set the main seal 30 and the surface 96d following the taper fully sets the main seal 30, both by axially moving into the land 46 opposite the main seal 30. No contact occurs between the un-set seals 32,34 and the pipe 16 until the main seal 30 is fully set.

The inboard seal 32 is set next. Like the main seal 30, the inboard seal 32 is initially begun setting by the taper 96f and is fully set by the surface 96d, both engaging the land 60 opposite the inboard seal 32. Contact may occur between the un-set outboard seal 34 and the pipe during setting of the inboard seal, but no deformation or deforming contact (i.e., setting) of the outboard seal occurs until after the inboard seal 32 is fully set. After full setting of the inboard seal 32, the outboard seal 34 is set, initially by engagement of the taper 96b radially into the connector body distal portion 42 and fully by engagement of the surface 96a into the distal portion 42. Lastly, the kickdown taper 96e initially begins to "kick-down" and the surface 96c fully "kicks-down" the main seal 30 by engagement with the land 46, after full setting of the outboard seal 34.

Figure 5:
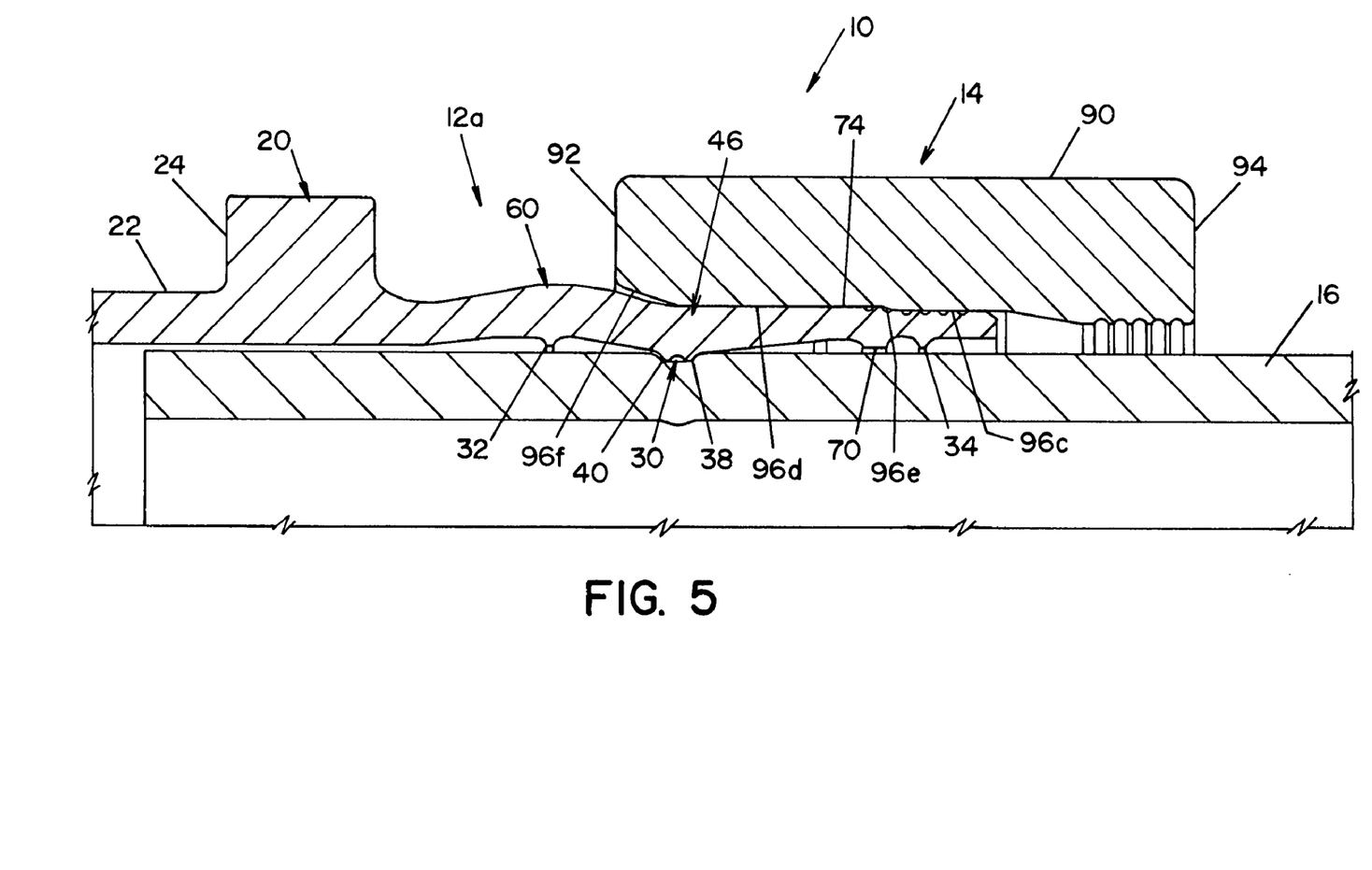
FIG. 5 is a partial cross-sectional view of the fitting assembly of FIG. 4 shown with the swage ring urging a main seal of the coupling body into the tube or pipe.

The sequential setting and sealing action of the seals 30,32, 34, including the kick-down of the main seal will now be described in more detail with reference to FIGS. 5-9. From the pre-install position, the swage ring 14 is forcibly moved toward the flange 20. As already described, the main seal 30 is the first to be set, with initial setting caused by the engagement of the taper 96f with the main seal land 46 and, with additional reference to FIG. 5, full setting caused by surface 96d engaging and passing over the land 46. Specifically, the main seal teeth 38,40 are urged or compressed radially inwardly against the pipe 16 by compression forces generated by engagement of the taper 96f and then the surface 96d with the land 46 opposite the main seal 30. As illustrated, the teeth 38,40 bite into and deform the pipe 16 and are themselves somewhat deformed, which functions to fill any rough or irregular surface imperfections found on the outside of the pipe 16. The spacing of the main seal 30 relative to the still un-set seals 32,34 is such that full setting of the main seal occurs independently of any setting of the un-set seals 32,34. As shown in FIG. 5, the un-set seals do not even contact the pipe 16 in the illustrated embodiment.

Also, concurrently with the setting of the main seal 30, there is slight radial movement of the outboard seal 34 as the taper 96e and following section 96c pass along the body distal portion 74, but this is generally insufficient to move the outboard seal 34 into contact with the pipe 16. The function of the main seal 30 is to substantially engage the pipe 16 to provide a hermetic seal therewith so that no fluid flowing through the pipe can escape between the seal 30, with its teeth 38,40 in the illustrated embodiment, and the pipe 16. When set, the seals, including the main seal 30, generally provide a barrier to the flow of fluid thereby and, additionally, act to grip the pipe 16 and prevent axial movement relative to the connector body 12. Specifically, in the illustrated embodiment, the teeth 38,40 are sufficiently wide and have a profile such that they can resist axial tensile loading of the pipe 16 which could occur should there be a force on the pipe 16 which might tend to pull it axially from the connector body 12.

Figure 6:
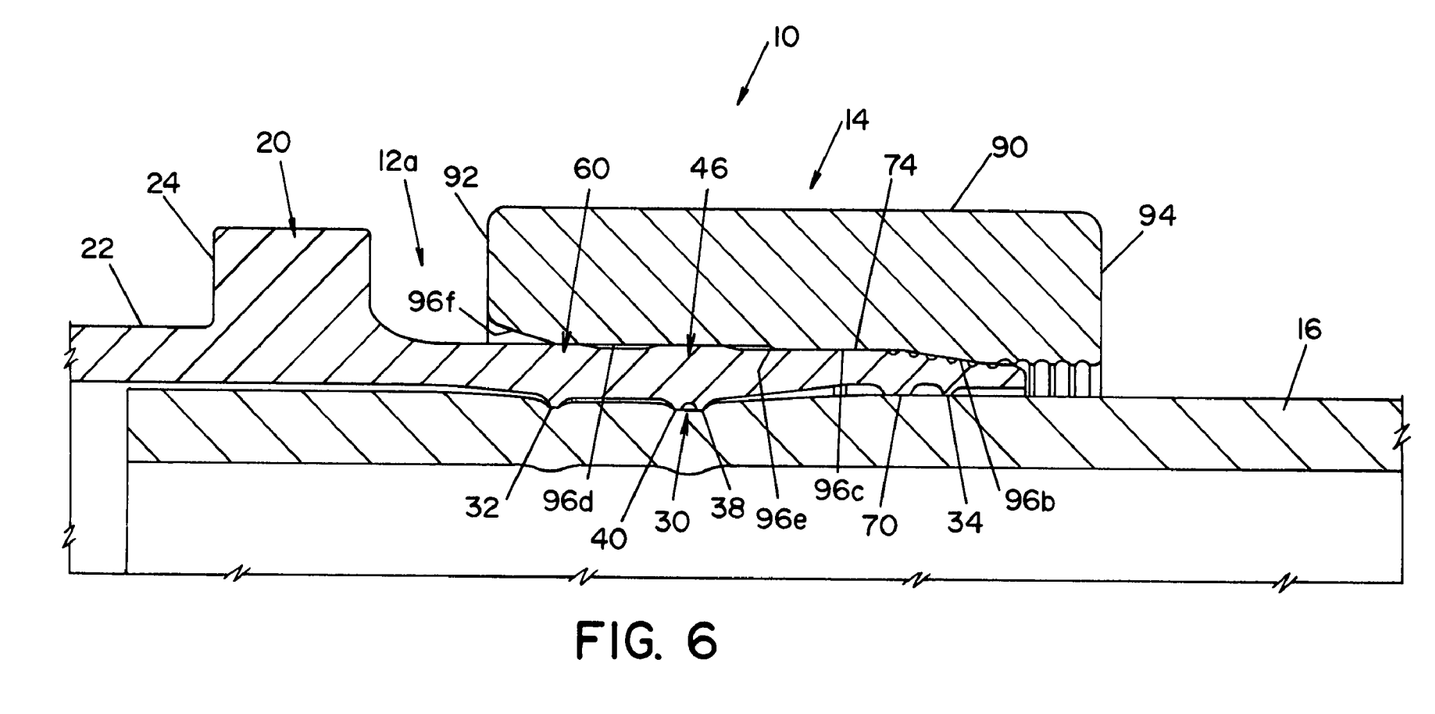
FIG. 6 is a partial cross-sectional view of the fitting assembly of FIG. 4 shown with the swage ring urging an inboard seal of the coupling body into the tube or pipe.

After full setting of the main seal 30, continued axial movement of the swage ring 14 causes the inboard seal 32 to be set, with initial setting caused by engagement of the taper 96f with the inboard seal land 60 and, with additional reference to FIG. 6, full setting caused by surface 96d engaging and passing over the land 60. Specifically, the single tooth inboard seal 32 is urged or compressed radially inwardly against the pipe 16 by compression forces generated by engagement of the taper 96f and then the surface 96d with the land 60 opposite the inboard seal 32. As illustrated, the tooth 32 bites into and deforms the pipe 16 and is itself somewhat deformed, functioning like the teeth 38,40 to fill in any rough or irregular surface imperfections found on the outside of the pipe 16. The setting of the inboard seal 32 occurs independently of any setting of the remaining un-set outboard seal 34, though, as shown, the outboard seal may be radially moved into nondeforming contact with the pipe 16.

Figure 7:
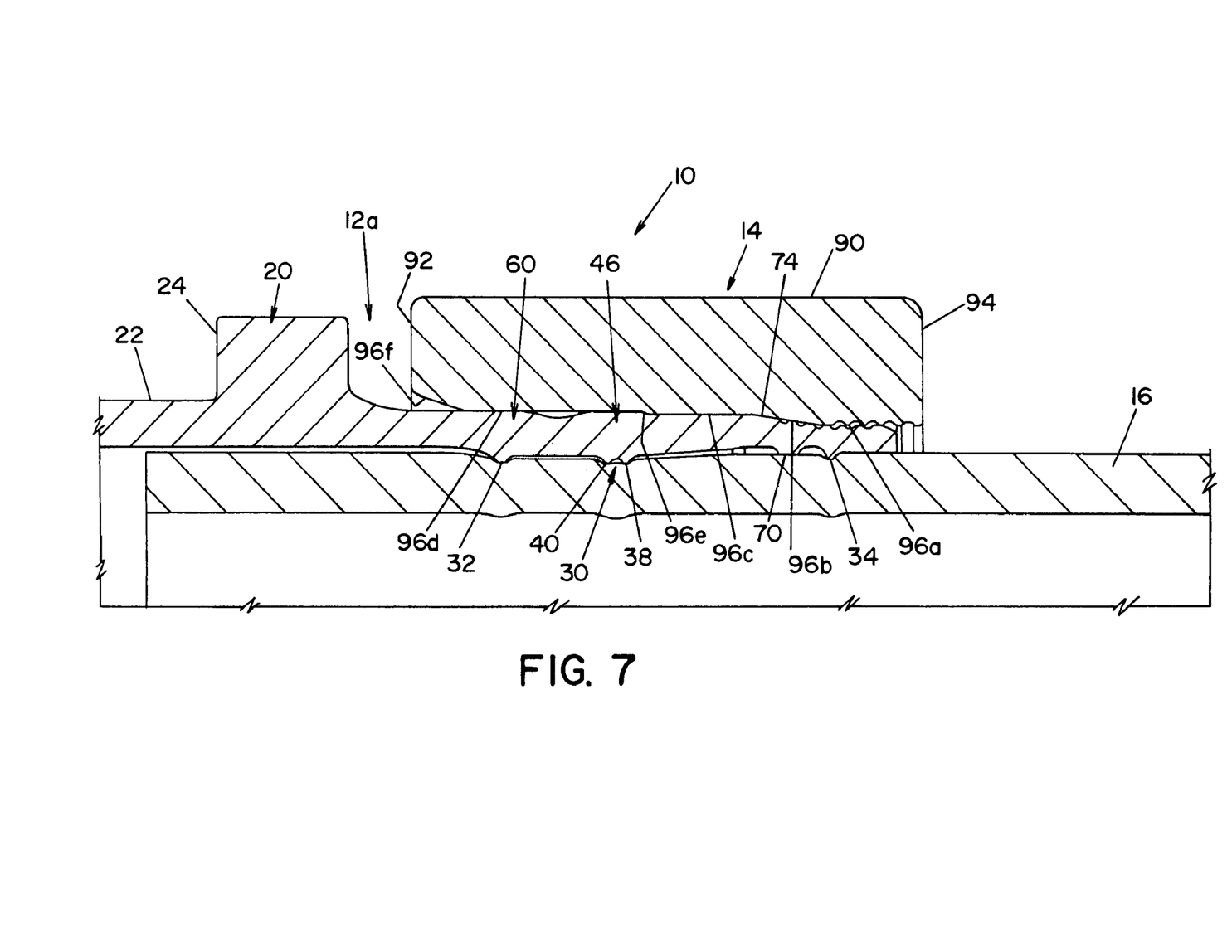
FIG. 7 is a partial cross-sectional view of the fitting assembly of FIG. 4 shown with the swage ring urging an outboard seal of the coupling body into the tube or pipe.

Still further continued axial movement of the swage ring 14 onto the connector body 12 causes the outboard seal 34 to be set. Initial setting is caused by engagement of the taper 96b with the distal portion 74. As already mentioned, the taper 96b can contact the distal portion 74 prior to full setting of the inboard seal 32 and cause the seal 34 to contact the pipe 16, but deformation of the pipe 16 by the outboard seal 34 does not occur until after full setting of the inboard seal 32. With further reference to FIG. 7, full setting of the outboard seal 34 is caused by distal compression surface 96a engaging and passing over the connector body distal portion 74. Specifically, the single tooth outboard seal 34 is urged or compressed radially-inwardly against the pipe 16 by compression forces generated by engagement of the taper 96b and then the surface 96a with the distal portion 74 from which the outboard seal 34 extends. As illustrated, the tooth 34 bites into and deforms the pipe 16 and is itself somewhat deformed, functioning like the teeth 32,38,40 to fill in any rough or irregular surface imperfections found on the outside of the pipe 16.

Preferably, the design or configuration of the connector body 12 is such that when the swage ring 14 is urged over the coupling body, the main seal 30 is urged into substantial biting and sealing engagement with the outer surface of the pipe 16. In comparison, the outboard seal 34 and the inboard seal 32 are each preferably designed to make at least a minimal bite into the outer surface of the pipe 16. Also preferably, the connector body 12 is configured so that the inboard seal 32 bites into the pipe 16 an amount substantially the same as the outboard seal 34 and both seals 32,34 bite into the pipe 16 an amount equal to or less than the amount the main seal 30 bites into the pipe 16, particularly after kickdown of the main seal 30. As will be appreciated by those skilled in the art, the inboard and outboard seals 32,34 function to prevent pivoting or rocking of the pipe 16 about a fulcrum established where the main seal 30 bites into the pipe 16 thereby preventing the pipe 16 from bending or flexing about the main seal 30, thus preventing, or at least reducing the likelihood of, relative motion between the main seal 30 and the pipe 16 and thus leakage at the point where the seal 30 engages the pipe 16.

After full setting of the outboard seal 34, continued axial movement of the swage ring 14 toward the connector body flange 20 causes kickdown of the main seal 30. Kickdown of the main seal is more fully described in commonly-owned U.S. Pat. No. 5,709,418, expressly incorporated herein by reference, but will be briefly described herein. As described above, when the swage ring 14 is moved axially toward the connector body flange 20 and forced over each of the seals 30,32,34, the connector body 12 is forced radially inward and setting of the seals causes the pipe 16 to be deformed radially inwardly. This radial movement of the connector body 12 and the pipe 16 is generally a very local effect, i.e., movement of the one of the seals into the pipe does not have any effect on the remaining seals, nor have any significant effect on the pipe adjacent the remaining seals.

Simultaneous with the radial movement of the connector body 12 and the deformation of the pipe 16, radial movement of the swage ring 14 occurs outwardly. As already mentioned, this radial movement of the swage ring 14 is typically elastic, and results in only a small increase in the diameter of the swage ring 14. As a result, the sequential setting of the seals 30,32,34 by the swage ring 14 causes incremental increases in the diameter of the swage ring 14. Thus, when the swage ring 14 sets the first seal 30, the swage ring 14 grows in diameter. When the swage ring sets the second seal 32, the swage ring 14 grows further in diameter, and likewise with the setting of the third seal 34. The incremental diameter growth of the swage ring 14 caused by the inboard and outboard seals 32,34, which straddle or flank the main seal 30, can have a small adverse effect on the area of the drive ring 14 adjacent the main seal 30, which ultimately could reduce the loading seen by the main seal 30.

To combat reduced loading on the main seal 30, the swage ring 14 includes the kickdown taper 96e and following cylindrical kickdown surface 96c. The kickdown taper 96e and surface 96c are an additional step in the bore 98 of the swage ring 14 that functions to reinforce or re-energize the initial loading placed on the main seal 30 by the drive ring surface 96d, particularly after the inboard and outboard seals 32,34 have already been fully set (and already effected growth in the drive ring diameter). Thus, with additional reference to FIG. 8, the kickdown taper 96e and then the kickdown surface 96c engage the already compressed land 46 opposite the main seal 30 to kickdown or restore a load-force on the main seal 30 thereby ensuring sufficient loading is maintained on the main seal by the swage ring 14.

Figure 8:
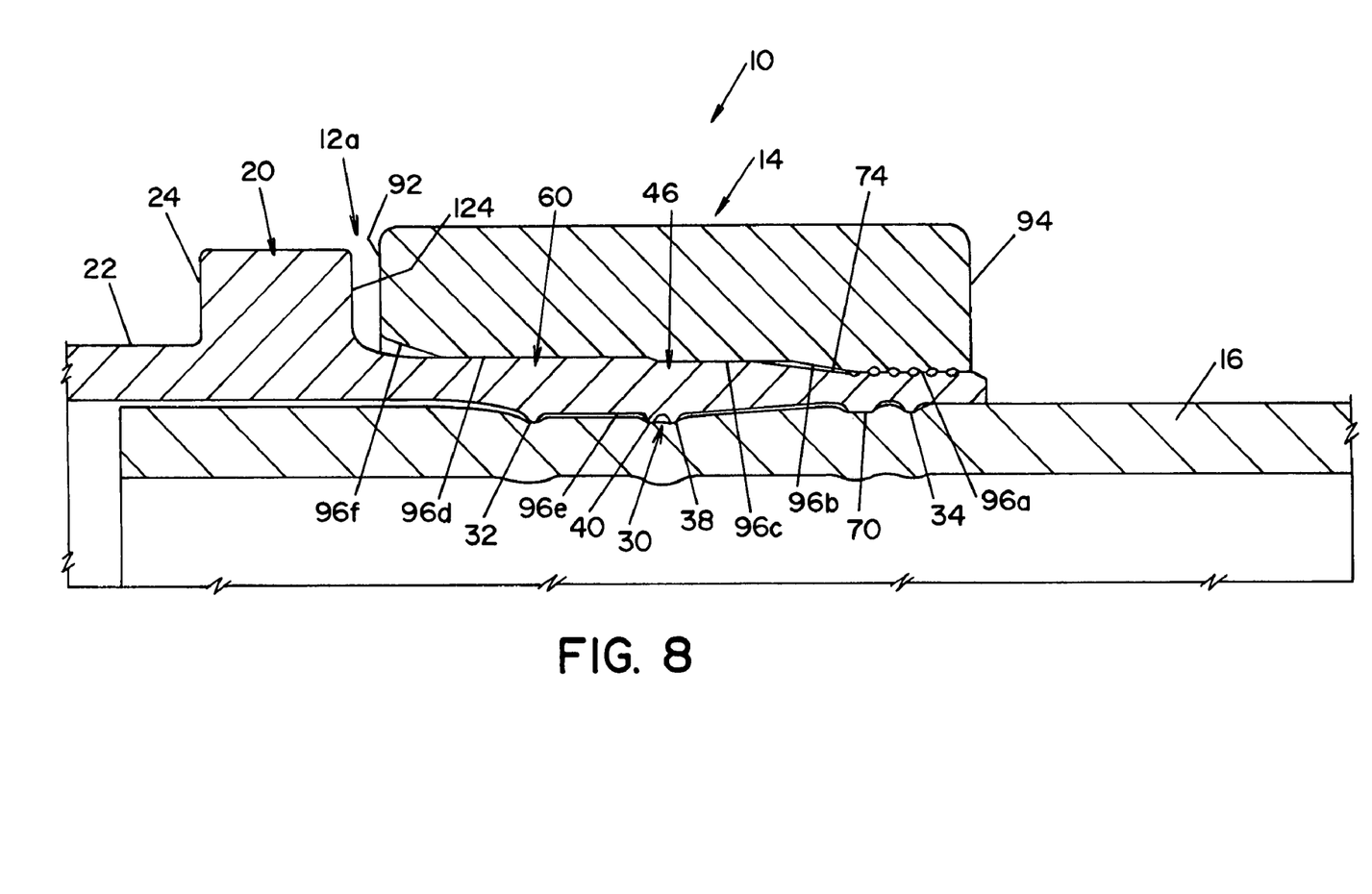
FIG. 8 is a partial cross-sectional view of the fitting assembly of FIG. 4 shown with the swage ring "kicking-down" the main seal into the tube or pipe.

In the illustrated embodiment, the torsion ridge 70 is driven into the pipe 16 as the main seal 30 is kicked down. Specifically, the taper 96b and proximal compression surface 96a engage the distal portion 74 opposite the torsion ridge 70 and force the torsion ridge radially into the pipe 16. The torsion ridge 70 acts as a gripping tooth and serves primarily to carry torsion loads between the connector body 12 and the pipe 16, but additionally can resist some axial loading on the pipe 16.

Figure 9:
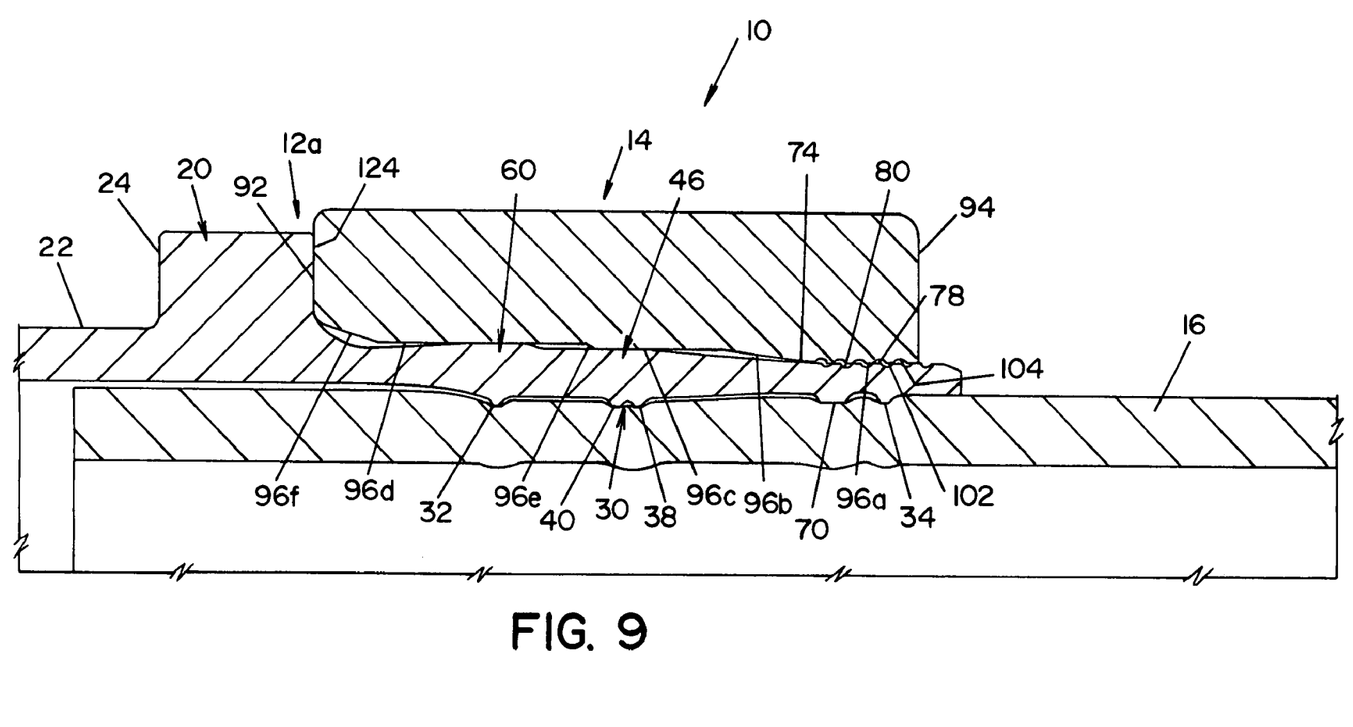
FIG. 9 is a partial cross-sectional view of the fitting assembly of FIG. 4 shown with the swage ring in a fully installed position on the coupling body.

With reference to FIG. 9, the swage ring 14 is further forced axially on the connector body sleeve 12a to the illustrated final install or proximal position. In this position, the swage ring 14 abuts or engages the connector body flange 20. More specifically, the distal surface 92 of the swage ring 14 abuts or engages surface 124 of the flange 20. Alternatively, the swage ring 14 could be positioned closely adjacent the flange 20 without contact therewith. In the final install position, all the seals 30,32,34 are set, including kickdown of the main seal 30, as well as biting of the torsion ridge 70 into the pipe 16. Cooperation between the connector body locking mechanism 78,80 of the distal portion 74 and the swage ring locking mechanism 102,104 prevents, or at least reduces the likelihood that, the swage ring 14 will axially dislodge itself from the connector sleeve 12a.

It is to be appreciated by those skilled in the art that the sequentially setting or swaging of the seals 30,32,34 and kicking-down the seal 30 described herein has, the advantage of reducing the amount of peak force that would be necessary if more than one seal, or all seals, were set simultaneously or if one of the seals 32,34 were set simultaneously With the kickdown of the main seal 30. Thus, the force required by the installation tool assembly used to drive the swage ring 14 onto the connector body sleeve 12a is reduced by means of the sequential setting of the seals. Moreover, the preferred sequential setting order of the seals 30,32,34 and kickdown of the main seal 30 described herein has additional advantages. As already discussed, the main seal 30 squeezes or swages the pipe 16 to a greater extent than the remaining seals 32,34. The double-tooth arrangement of the main seal 30 provides the main seal with a greater width than the, other seals 32,34 and thereby generates a greater reactionary force by the pipe 16 radially pushing out on the swage ring 14. The described sequential setting of the seals 30,32,34 starts with the main seal 30 so that as the other seals 32,34 are added, the incremental loading from one seal to the next is minimized, which also minimizes the effect on previously set seals.

In the illustrated embodiment, the swage ring 14 is thickened in the distal portion 14b adjacent the distal end 94. The thickened portion 14b increases the strength of the swage ring 14 in this area. The increased strength of the portion 14b makes setting of the outboard seal 34 after the other seals 30,32 desirable because any effect on the seals 30,32 when setting the outboard seal 34 is minimized due to the heavier or strengthened swage ring portion 14b. Kickdown of the main seal 30 occurs desirably after setting of the other seals 32,34 because kickdown generally is only a light or secondary swaging of the main seal 30 and has minimal effect on the adjacent seals 32,34. Accordingly, in the illustrated embodiment, the preferred sequential setting and kickdown order is first set the main seal, second set the inboard seal, third set the outboard seal and lastly kickdown the main seal.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fitting for making connections with a pipe, comprising:
   a coupling body having an inside surface defining a bore for receiving a pipe;
   a ring fitting over said coupling body for sealing and mechanically connecting said coupling body to the pipe;
   an axisymmetrical main seal formed on said inside surface of said coupling body that seals and connects to the pipe when said ring is installed on said coupling body;
   an axisymmetrical inboard seal formed on said inside surface of said coupling body axially spaced from said main seal that seals and connects to the pipe when said ring is installed on said coupling body, at least one of said coupling body and said ring configured so that said inboard seal seals and connects after said main seal seals and connects to the pipe;
   an axisymmetrical outboard seal formed on said inside surface of said coupling body axially spaced from said main seal that connects to the pipe when said ring is installed on said coupling body, at least one of said coupling body and said ring further configured so that said outboard seal seals and mechanically connects after said inboard seal seals and connects to the pipe; and
   at least one of said coupling body and said ring further configured to apply a restoring load to said main seal to further seal and mechanically connect said main seal to the pipe after said outboard seal seals and connects to the pipe.

2. The fitting of claim 1 wherein said coupling body includes a main seal land on an outside surface thereof adjacent said main seal and an inboard seal land on said outside surface adjacent said inboard seal, said seal lands engaged by said ring when installed on said coupling body to force and hold said main seal and said inboard seal in sealing and mechanically connecting relation with the pipe.

3. The fitting of claim 1 wherein said coupling body includes a circumferential flange having a tool engaging face for engaging a tool for forcibly installing said ring onto said coupling body.

4. The fitting of claim 1 wherein axial spacing between said seals is sufficient so that sealing and connecting of said main seal occurs independently and in advance of sealing and connecting of said inboard and outboard seals.

5. The fitting of claim 1 wherein axial spacing between said seals is sufficient so that sealing and connecting of said inboard seal occurs independently and after sealing and connecting of said main seal, and independently and before sealing and connecting of said outboard seal.

6. The fitting of claim 1 wherein axial spacing between said seals is sufficient so that sealing and connecting of said outboard seal occurs independently and after sealing and connecting of said main and inboard seals.

7. The fitting of claim 1 wherein said main seal substantially bites into the pipe and said inboard and outboard seals at least minimally bite into the pipe relative to said main seal when said ring is installed on said coupling body.

8. The fitting of claim 1 wherein said inboard and outboard seals bite into the pipe an amount less than said main seal bites into the pipe when said ring is installed on said coupling body.

9. The fitting of claim 1 wherein said main seal includes first and second teeth closely spaced from one another by a groove.

10. The fitting of claim 1 wherein at least one of said coupling body and said ring include circumferential ridges separated by grooves for engaging the other of said at least one of said coupling body and said ring to retain said ring on said coupling body.

11. The fitting of claim 1 wherein said coupling body includes a torsion ridge formed on said inside surface and having friction surfaces for resisting torsion between said coupling body and the pipe.

12. The filling of claim 11 wherein said torsion ridge is positioned axially between said outboard seal and said main seal, but axially spaced more adjacent said outboard seal.

13. The filling of claim 1 wherein said ring is a swage ring including:
   a proximal compression surface having a first proximal segment for sequentially sealing and mechanically connecting said main seal and then said inboard seal to the pipe;
   a distal compression surface for sealing and mechanically connecting said outboard seal to the pipe after said proximal compression surface seals and mechanically connects said inboard seal to the pipe, said distal compression surface having a smaller diameter than said proximal compression surface; and a second distal segment of said proximal compression surface having a smaller diameter than said first proximal segment for applying said restoring load to said main seal after said outboard seal is sealed and mechanically connected to the pipe.

14. The fitting of claim 1 further including a second coupling body in back to back relationship with said first coupling body for joining the first pipe to a second pipe, said second coupling body being at least one of formed integrally with and attached to said coupling body, said second coupling body also being substantially identical to said coupling body.

15. A fitting for making connections with a pipe, comprising:
a coupling body having an inside surface defining a bore for receiving a pipe and a plurality of seals extending into said bore from said inside surface;
a swage ring fitted over said coupling body for sequentially sealing and mechanically connecting said plurality of seals with the pipe;
said plurality of seals including:
a circumferentially continuous main seal spaced axially inward relative to a distal end of said coupling body,
a circumferentially continuous inboard seal spaced axially inward relative to said main seal, and
a circumferentially continuous outboard seal spaced axially outward relative to said main seal and axially inward relative to said distal end; and
wherein at least one of said coupling body and said ring is configured so that installation of said swage ring onto said coupling body sequentially causes said main seal, then said inboard seal and then said outboard seal to seal and mechanically connect with the pipe, at least one of said coupling body and said ring also configured so that installation of said swage ring onto said coupling body applies a kickdown force on said main seal after said outboard seal is sealed and mechanically connected to the pipe.

16. The fitting of claim 15 wherein said coupling body includes a main seal land on an outside surface of said coupling body opposite said main seal and an inboard seal land on said outside surface opposite said inboard seal, said swage ring includes:
a proximal compression surface for engaging said seal lands and thereby forcing said main and inboard seals radially into the pipe to seal and mechanically connect thereto,
a distal compression surface having an inside diameter that is smaller than said proximal compression surface and smaller than an outside diameter of said coupling body opposite said outboard seal, said distal compression surface engaging said outside diameter of said coupling body opposite said outboard seal to force said outboard seal radially into the pipe to seal and mechanically connect thereto, and
wherein said proximal compression surface includes a kickdown section of reduced diameter for applying said kickdown force.

17. The fitting of claim 15 wherein axial spacing between said seals is sufficient so that sealing and connecting of said main seal occurs independently and in advance of sealing and connecting of said inboard and outboard seals, sealing and connecting of said inboard seal occurs independently and after sealing and connecting of said main seal as well as independently and before sealing and connecting of said outboard seal, and sealing and connecting of said outboard seal occurs independently and after sealing and connecting of said main and inboard seals.

18. The fitting of claim 15 wherein said inboard seal bites into the pipe an amount substantially the same as said outboard seal and said inboard and outboard seals bite into the pipe an amount less than said main seal bites into the pipe when said ring is installed on said coupling body.

19. A swage ring and coupling body arrangement, comprising:
a swage ring having a proximal compression surface and a distal compression surface having a diameter smaller than said proximal compression surface, said proximal compression surface including a first proximal section and a second kickdown section of reduced diameter;
a coupling body having an inner surface defining a bore for receiving a pipe and an outer surface over which said swage ring is received for mechanically and sealingly connecting said coupling body to the pipe, said inner surface including a plurality of radially extending seal structures including a main seal structure, an inboard seal structure and an outboard seal structure, said outer surface including a plurality of radially extending lands including a main seal land opposite said main seal and an inboard seal land opposite said inboard seal;
the swage ring surfaces and the coupling body lands and seal structures are such that axial installation of said swage ring onto said coupling body first causes said proximal compression surface to engage said main seal land and thereby force said main seal structure to bite into the pipe, next causes said proximal compression surface to engage said inboard seal land after said main seal structure bites into the pipe and thereby force said inboard seal structure to bite into the pipe, still next causes said distal compression surface to engage said coupling body opposite said outboard seal structure after said inboard seal structure bites into the pipe and thereby force said outboard seal structure into the pipe and finally causes said second kickdown section to apply a kickdown force to said main seal structure for restoring any lost load forces resulting from subsequent loading of said inboard and outboard seals.

20. A method of connecting a fitting to a pipe wherein the fitting includes a coupling body and a swage ring for axial installation over the coupling body, comprising:
inserting the pipe through a throughhole of the swage ring and into a bore of the coupling body;
axially moving the swage ring onto the coupling body to sequentially seal and mechanically connect a plurality of seals extending radially from the coupling body into the bore with the pipe, including the sub-steps of:
setting a circumferentially continuous main seal of a plurality of seals into the pipe to mechanically connect and seal the coupling body to the pipe,
after setting of the main seal, setting the circumferentially continuous inboard seal of the plurality of seals into a pipe to further mechanically connect and seal the coupling body to the pipe,
after setting of the inboard seal, setting the circumferentially continuous outboard seal of the plurality of seals into the pipe to still further mechanically connect and seal the coupling body to the pipe,
after setting of the plurality of seals, applying a load force onto the main seal for restoring any lost force to the main seal due to the subsequent setting of the inboard and outboard seals.

21. The fitting of claim 13 wherein the swage ring further includes a taper interposed between the proximal compression surface and the distal compression surface.

22. The fitting of claim 16 wherein said swage ring includes a taper disposed between the distal compression surface and the proximal compression surface.

23. The swage ring and coupling body arrangement of claim 19 wherein the swage ring further has a taper interposed between the proximal compression surface and the distal compression surface, and wherein the second kick down section of reduced diameter is adjacent the taper.

* * * * *